United States Patent [19]

Craven et al.

[11] 4,195,923

[45] Apr. 1, 1980

[54] SYSTEM FOR PRODUCING PHOTOGRAPHS

[76] Inventors: Jack L. Craven, 1006 N. Princeton, Fullerton, Calif. 92631; Ernest B. Marjoram, 17874 E. Baintree Ave., Rowland Heights, Calif. 91745; H. Dale Sandeffer, 1012 Laguna, Anaheim, Calif. 92801; Charles J. Stewart, 2827 Westbrook Dr., Apt. 507, Fort Wayne, Ind. 46805

[21] Appl. No.: 883,799

[22] Filed: Mar. 6, 1978

[51] Int. Cl.² .................. G03B 17/50; G03B 17/24; G03B 17/26; G03D 17/00

[52] U.S. Cl. ............................... 354/91; 354/109; 354/277; 354/315

[58] Field of Search .............. 354/83, 110, 88–93, 354/105, 106, 120, 276, 277, 297, 307, 310–312, 315, 316, 331, 336; 355/43, 39

[56] References Cited

U.S. PATENT DOCUMENTS

| | | | |
|---|---|---|---|
| 773,157 | 10/1904 | Petrie | 354/315 |
| 1,218,273 | 3/1917 | Kiss | 354/89 |
| 2,114,638 | 4/1938 | Parker | 354/277 |
| 2,648,265 | 8/1953 | Candela | 354/277 |
| 2,721,078 | 10/1955 | Caps | 354/89 X |
| 2,760,418 | 8/1956 | Hawn | 354/88 |
| 3,017,235 | 1/1962 | Sigmond | 354/106 X |
| 3,405,625 | 10/1968 | Carlson | 354/336 |
| 3,547,020 | 12/1970 | Goldfarb | 354/90 |
| 3,928,863 | 12/1975 | Stewart et al. | 354/110 X |
| 4,011,570 | 3/1977 | Stievenart et al. | 354/89 |

FOREIGN PATENT DOCUMENTS

1534506  6/1968  France ....................... 354/93

*Primary Examiner*—Donald A. Griffin
*Attorney, Agent, or Firm*—Ronald D. Welch

[57] ABSTRACT

A portable, self contained apparatus for exposing and developing photographic film, the apparatus including a camera, a processor unit, and a manually transportable film transfer vehicle. The transfer vehicle is insertable into the camera to receive exposed film into a light impervious chamber therein and into the processor to eject exposed film from the light impervious chamber thereinto. The processor unit utilizes wet processing chemistry and has a plurality of fluidly connected developing and reservoir chambers for developing exposed photographic film and storing the processing chemistry to facilitate transport of the apparatus, respectively, as well as effecting replenishment, heating, and level control of the photographic developing chemistry used in the apparatus.

36 Claims, 16 Drawing Figures

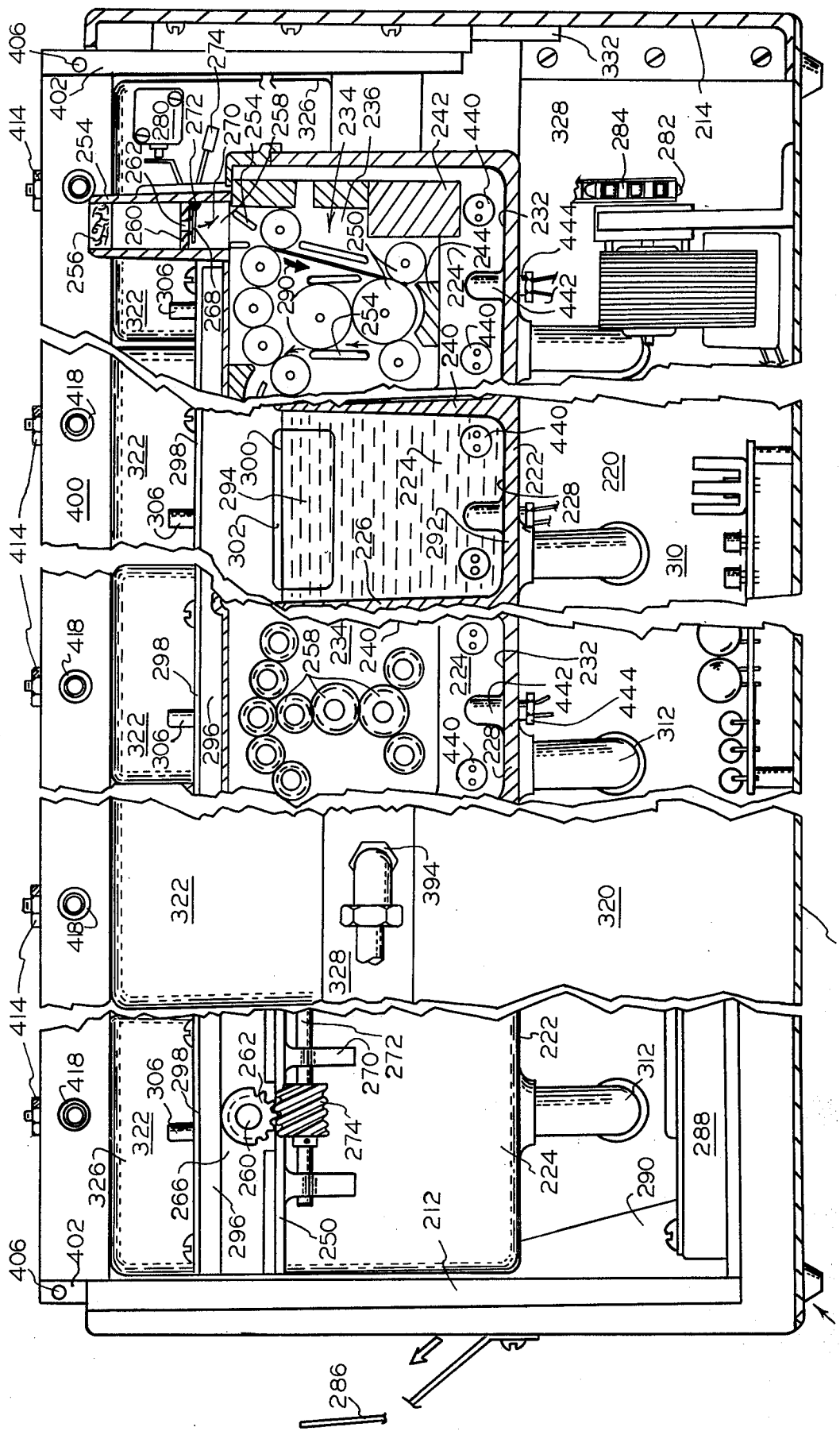

SYSTEM FOR PRODUCING PHOTOGRAPHS

BACKGROUND OF THE INVENTION

1. Field of the Invention

The present invention is a photograph producing system and more particularly is a small, portable photographic film exposing and processing system comprised of a camera, self-contained wet processor, and a transfer vehicle for transfering exposed film from the camera to the processor, the system being particularly well suited for on-site production of a photographic print.

2. Description of the Prior Art

Equipment capable of on-site production of photographic prints are suited for many uses. For example, such equipment is well suited for the production of photographic identification cards used for drivers licenses, charge plates, and the like. Such equipment is also useful for the production of "proofs" in commercial portrait photography and in particular in the type of commercial photography in which childrens portraits are produced by a traveling studio operating in shopping centers, large commercial retail outlets and the like. Another application of such equipment is the production of copy prints from other prints or negative exposures.

Heretofore, on-site production of photographic prints, and in particular, color photographic prints, has been effected either by the use of the transfer process instant positive print film such as that manufactured by the Polaroid Corporation and Kodak Corporation. This type of system is limited to the size of photographs that can be produced and is inherently expensive. It is also recognized in the photographic arts that the "instant print" films tend to have less resolution and produce more color distortion than films developed by conventional wet process techniques. When using this type of film, the emulsion carrying medium is limited and superior emulsion bearing media such as plastics and special papers especially well suited for laminating and the like can not be used.

In another on-site method of producing photographic prints, a large, relatively expensive camera and wet film processor system are integrally mounted within a photographic booth or the like. In addition to the cost of the equipment, such systems are large and difficult to move, produce substantial variations in the quality of the photographic print produced and require frequent servicing as a result in deterioration in the photographic developing chemistry and the complexities of the mechanisms.

Systems producing copy prints are also available but are characteristically even more expensive and complex than those used for on-site production of photographs taken directly of a subject, such systems frequently requiring the production of an intermediate negative before copy of the photographic print can be produced.

To provide all of the advantages of a wet process photographic print producing system with its inherently better photographic qualities and versatility such as improved resolution and color accuracy, adaptability for emulsions provided on special papers and plastics and adaptable for lamination of the variety of laminating materials and equipment, and which is relatively small, portable, and inexpensive, it is desirable to provide a self contained photographic print producing system that provides all of the necessary facilities for exposing and producing wet processed photographic prints.

SUMMARY OF THE INVENTION

It is therefore an object of the invention to provide a self-contained system for producing photographic prints.

It is another object of the invention to provide such a system which incorporates wet processing of photographic emulsions.

Still another object of the invention is to provide such a system incorporating a camera and a wet film processor and a transfer device which enables transfer of exposed film from the camera to the processor.

Another object of the invention is to provide a portable wet processor wherein the processor can be moved without spillage of fluids.

Yet another object of the invention is to provide a processor which permits simple replenishment of the processing fluids.

Still another object of the invention is to provide a wet film processor which automatically regulates the fluid level of the processing chemistry.

Another object of the invention is to provide a wet film processor which incorporates a unitized system for maintaining photographic developing chemistry levels, replenishment of photographic developing chemistry and spill-proof storage of the developing chemistry during transport.

Yet another object of the invention is to provide a wet processor which effects uniform, reliable, and repeatable processing of positive print photographic film.

Another object of the invention is to provide a photographic identification card system which includes a camera, a film transfer device, and film processor which are integrated to provide transportable units, permit operation by inexperienced personnel, and produce high quality photographic prints.

Broadly, the invention is a self-contained and portable photographic print producing system comprised of a camera, a wet film processor unit, and a film transfer device for transferring exposed photographic emulsions from the camera into the film processor. The film processor incorporates a plurality of processing and reservoir tanks, the latter being operable between raised and lowered positions for charging the film processing tanks for developing prints and storing the developing chemistry for transport of the processor, respectively.

The processing tanks and reservoir tanks are interconnected by a unique fluid transfer system which automatically maintains the fluid levels in the processing tanks, facilitates draining of the processing tanks into the reservoir tanks and further enables replenishment of the chemistry in the processing tank.

The film transfer device is a small, manually operable apparatus which retrieves exposed film from the camera without risk of exposure of the film to stray light and automatically injects exposed film into the wet processor for processing.

The processor further includes a structure for reducing contamination of the photographic chemistry, evaporation, dissipation of noxious fumes and odors, and prevents intermixing of different elements of the photographic developing chemistry, as well as providing for simple replacement of the developing chemistry without loss or spillage.

The system further includes a camera provided with unique optical systems for forming single or composite images directly onto a photographic print emulsion and provided with one or more illuminating devices for illuminating portrait subjects, data cards, and photographic prints as required.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein:

FIGS. 5a, 5b, 5c, 5d and 5e are cross-sectional views of the processor unit taken generally along sections lines 5a—5a, 5b—5b, 5c—5c, 5d—5d, and 5e—5e of FIG. 4;

DESCRIPTION OF A PREFERRED EMBODIMENT

Figure 1:
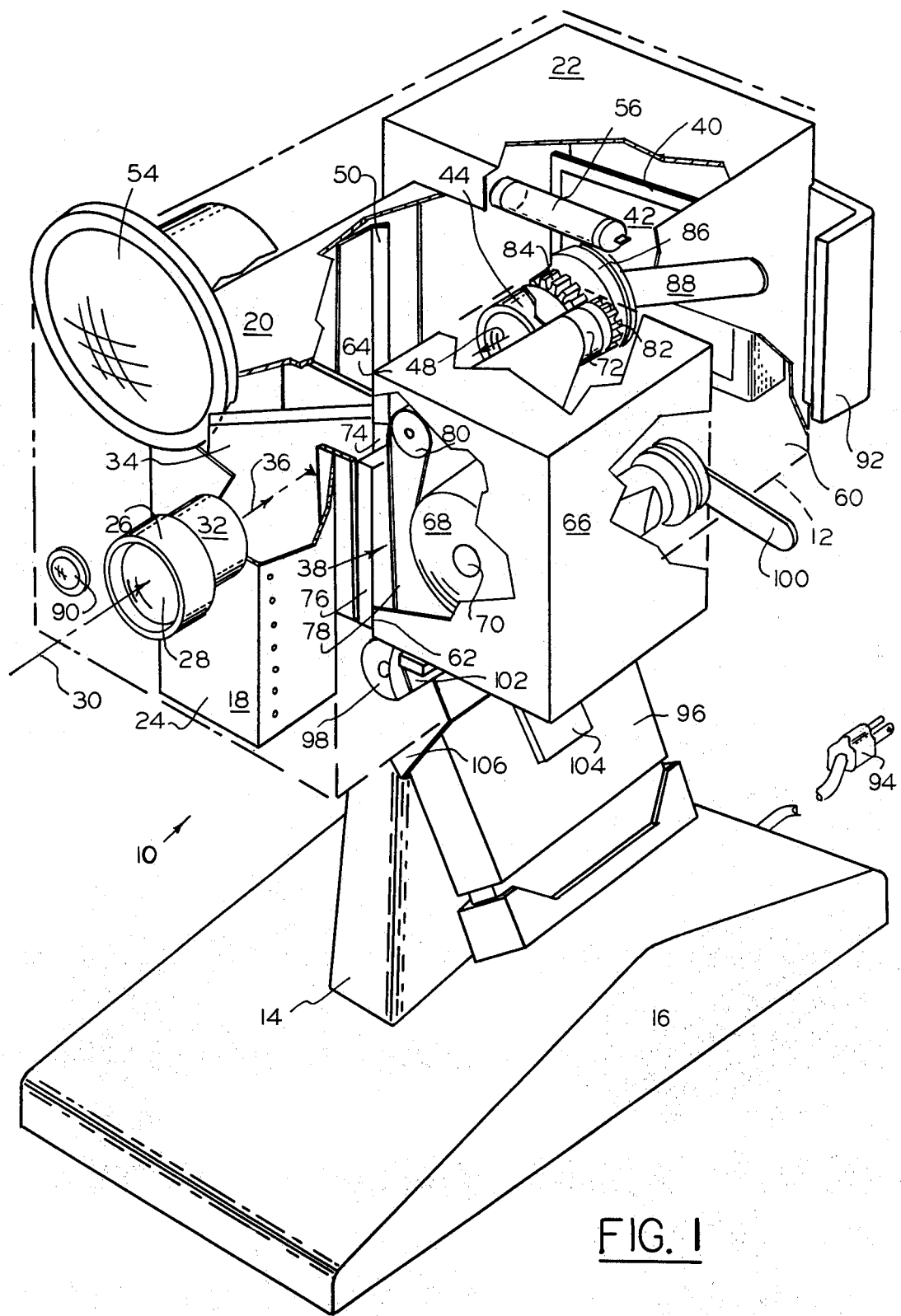
FIG. 1 is a partially cut away perspective view of an identification card camera, film magazine, and film transfer vehicle.

Referring first to FIG. 1, there is shown an identification card camera 10 which comprises an external housing 12, shown in dashed lines, rotatably mounted upon a pedastel 14 which in turn is fixedly mounted to a base 16. The housing 12 will typically incorporate removable panels and supporting framework of conventional design which are not illustrated for clarity, such structures being well known and matters of choice.

Mounted within the housing 12 are a plurality of optically connected light-tight enclosures 18, 20 and 22 which may be conveniently referred to as the subject optics housing 18, data card optics housing 20 and data card housing 22. Mounted to the forwardly disposed wall 24 of housing 18 is a subject lens assembly 26. Assembly 26 comprises a conventional corrected lens 28 configured to form the image of the bust portion of a subject (not shown) positioned about 4 to 6 feet in front of the lens 28 in alignment with the optical axis 30 thereof. Coupled to the lens assembly 26 is a conventional, electrically operated shutter assembly 32, which will also typically incorporate an iris mechanism (not shown) for adjusting the effective aperture of lens assembly 28. Lens assembly 26 may also be provided with means (not shown) to permit the use of suitable filters (not shown) to effect color corrections, contrast, and the like of exposures.

Figure 10:
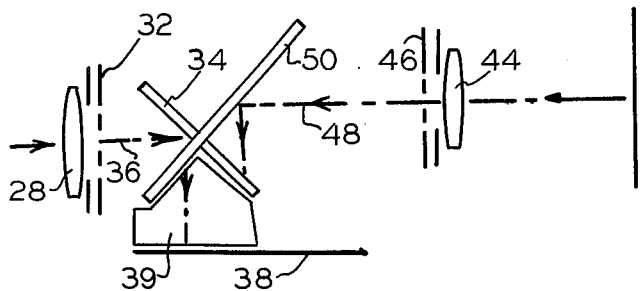
FIG. 10 is a simplified perspective schematic of the optical system used in the identification card camera.
Figure 2:
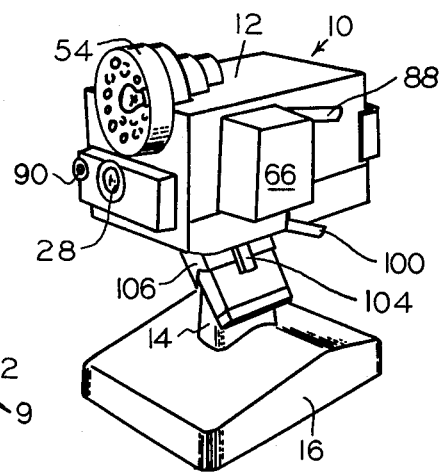
FIG. 2 is a perspective view of the identification card camera unit with the film transfer vehicle inserted therein.

As can be seen in FIGS. 1 and 10, a flat, first-surface mirror 34 is positioned optically behind lens and shutter assemblies 26, 32 in alignment with optical axis 30 and disposed at about a 45° angle with respect thereto.

Mirror 34 reflects an image transmitted by lens assembly 26 along an optical axis 36 disposed at about 90° with respect to axis 30 and onto an image plane indicated generally at 38. It will be observed that this image will have been inverted and reversed by the lens assembly 26, and reversed by mirror 34 such that, the image will be inverted and of proper right and left configuration when viewed from the side of image plane 38 disposed towards mirror 34.

Housing 22 is provided with a light-trapping slot assembly 40 adapted to removably receive a data card 42 therein. The data card 42 is typically provided with informational indicia of the subject (not shown) such as height, weight, credit rating, driving restrictions, or the like. Optically aligned with the data card 42 is a data card lens assembly 44. The lens assembly 44 transmits an image of the data card 42 along an optical axis 48. Optically aligned with the axis 48 is a second first-surface mirror 50, mirror 50 being disposed at about a 45° angle with respect to axis 48 and in optical alignment therewith such that the mirror 50 will reflect the image of the data card 42 formed by lens assembly 44 along an optical axis disposed substantially perpendicular to axis 48. Lens assembly 44 is selected such that it will form an image of the data card 42 in image plane 38.

As can best be seen in FIG. 10, the images of the subject (not shown) and data card 42 are formed on mutually exclusive but contiguous portions of the image plane 38 thereby forming a composite image of the subject and data card. A light tunnel 39 (FIG. 10 only) is disposed coaxially in alignment with axis 36 and functions to prevent the subject image and stray light from reaching the portions of the image plane reserved for the data card image. The tunnel 39 should be spaced optically in front of the image plane 38 to prevent the formation of a black (unexposed) border around the subject image.

Also provided is a photo flash assembly 54 situated to illuminate the subject (not shown) and a photo flash device 56 situated within housing 22 in a position to illuminate the data card 42. In conventional manner, photo flash devices 54 and 56 are operated by switch means operatively incorporated in the shutter assembly 32. The shutter assembly, in turn, is operatively responsive to means such as a pushbutton switch (not shown) mounted to the rear of the camera housing 12 and simultaneously operable in response thereto.

Preferably, electrical and electronic items such as power supplies for the photo flash units 54, 56, shutter assembly 32, indicator lights and the like are mounted within the base housing 16.

The side 60 of housing 12 is provided with a rectangular recess 62 complementary to the end portion 64 of a film magazine 66. Magazine 66 is itself generally rectangular and has a roll of film 68 rotatably mounted therein on shaft 70. The film 68 is trained upwardly over a feeding roller 72, exits the film magazine 66 via a light-tight slot (not shown) and passes vertically downwardly against the front wall 74 of the magazine 66 such that a single frame 71 of the emulsion surface of the film 68 is disposed in the image plane 38 where the composite image of the subject (not shown) and data card 42 are formed. As is common practice in the photographic arts, magazine 66 is closely fitted within the recess 62, the latter preferably being provided with light trapping material such as felt about its periphery to prevent the entrance of stray light into the image area 38.

A transparent security plate 76 is mounted to the forwardly disposed surface 74 of magazine 66 and is provided with a film passing slot such that the film 68 may be passed between the plate 78 and the magazine surface 74. The plate 78 functions to hold the film 68 flat in the image plane 38 and is further provided with indicia such as a certifying seal, logo, or the like. This indicia may be opaque or semi-opaque as desired and, because of its position closely adjacent the film plane 38 and by reason of the subject and data card images passing therethrough, will form a third element or portion of the composite image in the film plane 38 such that, upon exposure of the film frame 71 disposed within the image plane 38, the indicia will become a permanent part of the composite image photograph.

Advancement of the film 68 is effected by roller 72 which is drivingly coupled to a shaft 80 which extends outwardly from the magazine 66 and to which is drivingly fitted a gear 82. Gear 82 in turn operatively engages a drive gear 84, the latter being rotatably mounted to the camera housing 12 in a position such that gears 82, 84 are meshed when the magazine 66 is inserted into the housing 12. Gear 84 is driven by a unidirectional clutch and ratchet assembly 86 which is in turn manually operated by means of an advance lever 88 coupled thereto. Assembly 86 is of a type that permits rotation of the gear 84 in one direction only and permits rotation of the gear 84 in fixed rotational increments only to thereby insure positive advancement of film 68 in full single frame 71 increments only.

The camera 10 may further be provided with a conventional aiming and focusing light assembly 90, positioning handles 92 and an electrical cord and plug 94 for providing operating energy to the unit.

As will be explained in more detail below with reference to FIGS. 8 and 9, the film 68, following exposure and advancement, passes into a film transfer vehicle or septum 96. The film is then manually cut by means of a cutter bar 98 operated by lever 100 subsequent to which the cut film frame 102 is manually drawn into the septum 96, again, as will be explained in detail below. The septum 96 is released from the camera housing by means of a release lever 104 thereby permitting the cut film frame 102 to be transported to a film processor, also to be explained in detail below.

Figure 8:
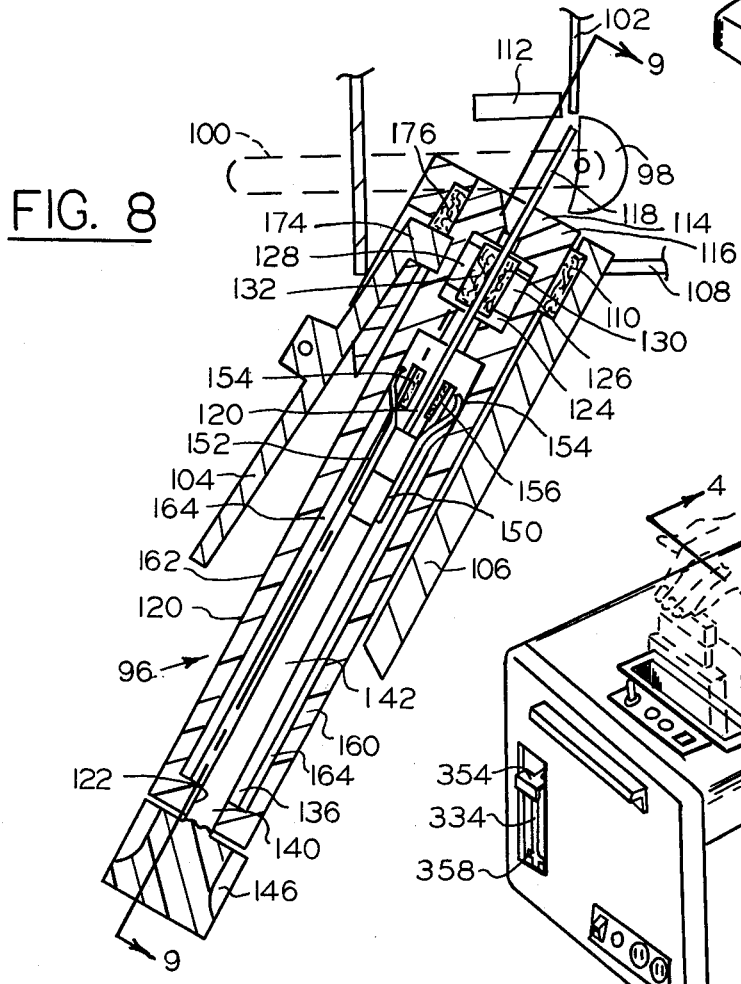
FIG. 8 is a cross-sectional view of the film transfer vehicle.
Figure 9B:
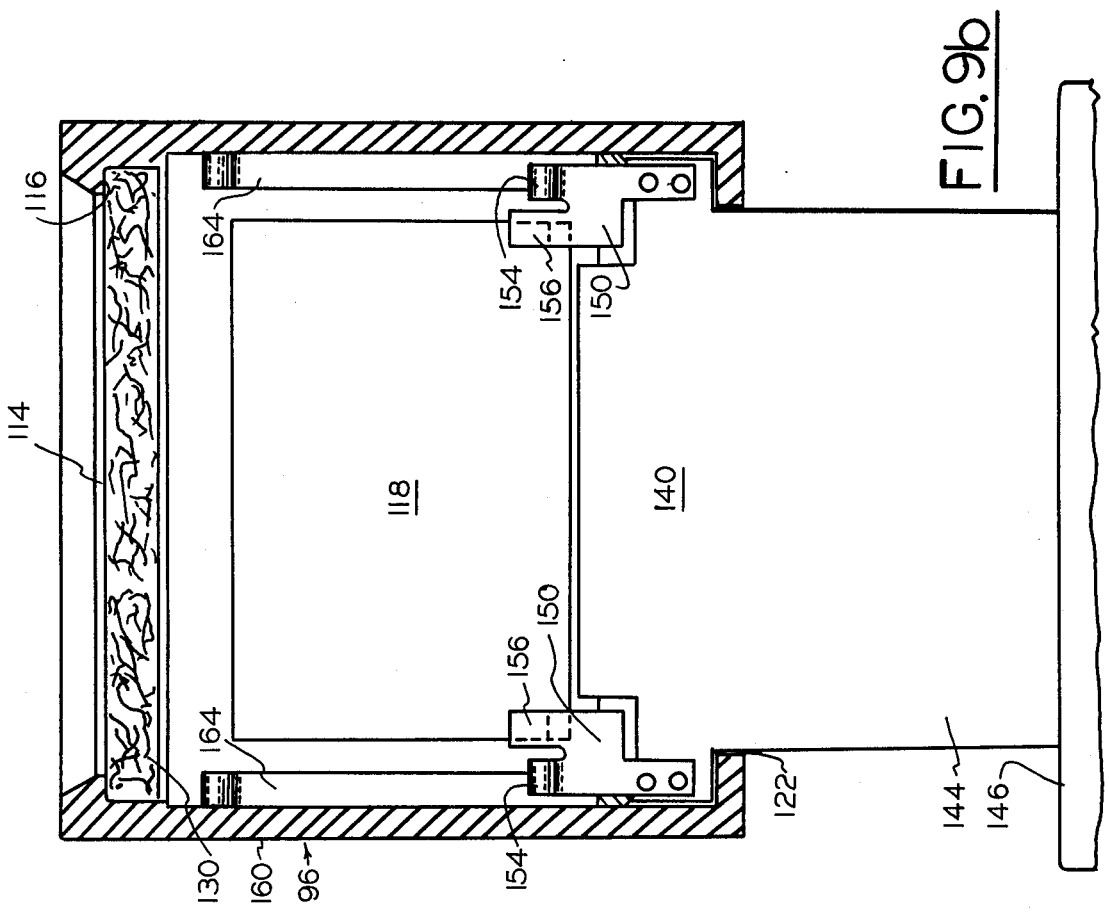
FIGS. 9a and 9b are cross-sectional views of the film transfer vehicle taken generally along section line 9—9 of FIG. 8.
Figure 9A:
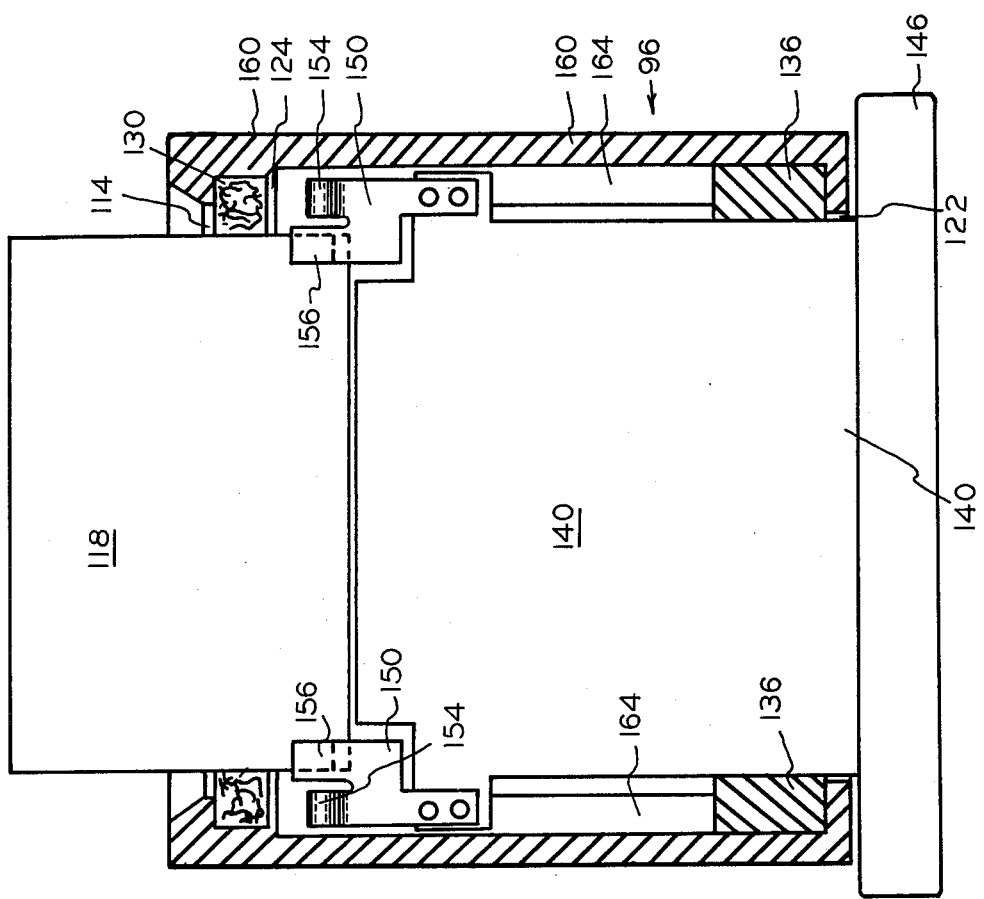

Referring to FIGS. 8 and 9, the septum 96 is shown in cross-section, the camera 10 in FIG. 8 being shown in simplified schematic form for clarity and for purposes of explanation. The septum 96 is initially received in a receptacle 106 fixedly mounted to the undersurface 108 of the camera 10, receptacle 106 being complementary to the peripheral surface of the septum 96 and preferably being lined with suitable light-impervious fabric as at 110. Subsequent to exposure of a frame of film 71, film advance lever 88 is operated driving gear 82 and roller 72 to move the film 68 downwardly from the housing past rotating cutter bar 98 and a stationary cutter bar 112. The film 68 passes into an entrance aperture 114 in the upper end 116 of the septum 96. The cutter bar lever 100 is now operated, shearing the film between rotating cutter bar 97 and stationary cutter bar 112, at which point the single cut frame 102 of the film has its distal end 120 received within the aperture 114 from which position, the cut frame 102 is ready to be drawn into the septum 106 and transferred to the processor (to be described below).

The transfer vehicle 96 comprises generally a rectangular, light impervious housing 120 having rectangular apertures 114 and 122 at its opposite ends. Aperture 114 is narrow and beveled to facilitate entry of the cut film frame 102. A peripheral recess 124 is formed inwardly of the aperture 114. Bowed spring elements 126, 128 are disposed in oppositely disposed portions of the recess 124. Oppositely disposed light-sealing pads 130, 132 are also disposed within the peripheral recess 124 and are resiliently maintained in engagement with one another by the springs 126, 128. Light-sealing pads 136, 138 are fixedly secured about the periphery of aperture 122.

A sliding member 140 having opposite ends 142, 144, and a handle portion 146 at the end 144 thereof, is slidably received within the housing 96 for movement between inserted and withdrawn positions shown in solid and dashed lines in FIG. 8, respectively. Fixedly secured to the end 142 of member 140 are oppositely disposed pairs of spring elements 150, 152, each of the spring elements 150, 152 includes a cam portion 154 and pad mounting portion 156.

Provided on the internal surface of the oppositely disposed walls 160, 162 of housing 96 are longitudinally extending cam ridges 164 disposed to engage the cam portions 154 of the spring elements 150, 152 as the latter are moved longitudinally downwardly (as viewed in FIG. 8) within the housing 96. It will thus be seen that as the sliding member 140 is moved outwardly with respect to the housing, the cam surfaces 154 will engage the cam ridges 164 which will in turn force the pad mounting portions 156 of the spring elements 150, 152 together. This will force the pads 170 together to thereby grasp the end of the film frame 118 disposed within the housing 96. Further movement of the sliding member 140 will draw the film frame fully within the housing 96. When the film frame clears the light-impervious pads 130, 132, the pads will move together under the force of the springs 126, 128 thereby preventing the entry of any light into the housing 96. The septum 96 can now be removed from the septum receptacle 106 by depressing the septum latch lever 104, causing the inner end 174 thereof to be disengaged from a retaining recess 176 formed in the end of the septum housing 96. By reverse manipulation of the sliding member 140, the film can be ejected from septum 96.

Referring now to FIGS. 4 through 7, the wet film processor 200 is enclosed in a housing 202. Housing 202 may, for example, comprise a base 204 of molded plastic or pressed metal, removable side panels 206, 208, a top panel 210 and end panels 212, 214, all secured together and reinforced with suitable reinforcing members as at 216. The particular configuration of the housing and frame is substantially a matter of choice depending upon desired aesthetics and manufacturing considerations but should, in any event, be durable and resistant to damage to facilitate the portability of the processor 200. Mounted within the left portion (as viewed in FIG. 4) 220 of the housing 200 is an elongated processing tank 222 which, as can best be seen in FIGS. 5a through 5e, is divided into a plurality of juxtaposed processing chambers 224 by means of chamber dividing walls as at 226, walls 226 being formed as an integral part of the processing tank 222. A drain orifice 228 including a tubular connector portion 230 (FIG. 4) is formed in the bottom of each of the chambers 224. While not illustrated, the bottom surfaces 232 of the chambers 224 are preferably sloped downwardly with the orifices 228 being at the lowest point thereof to facilitate draining of the chambers 224 as will be described below.

Figure 4:
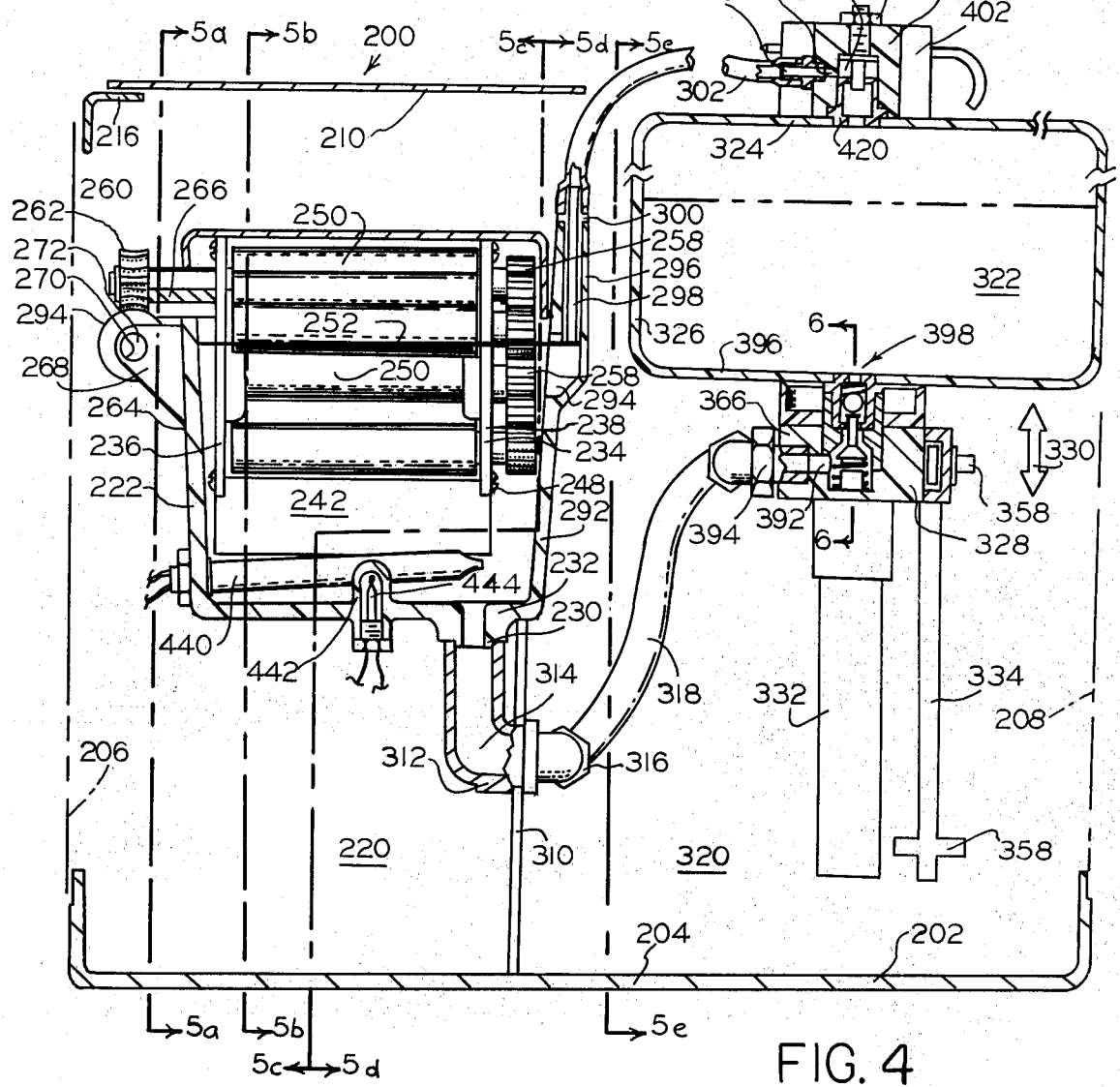
FIG. 4 is a cross-sectional view of the processor unit taken generally along section line 4—4 of FIG. 3.

Fixedly mounted within the processing tank 222 is a film conveyor assembly indicated generally at 234, portions of the assembly 234 appearing in FIGS. 5c and 5e and in FIG. 4. The assembly 234 includes a pair of generally planar, parallel, spaced-apart bearing plates 236, 238, each of the plates 236, 238 being provided with a plurality of elongated slots as at 240 which accommodate the chamber dividing walls 236. Plates 236, 238 are fixedly secured together by means of a plurality of spacer blocks as at 242, 244, and 246, blocks 242, 244 and 246 being secured by suitable threaded fasteners as at 248.

A plurality of rollers 250 have their opposite ends journaled in the plates 236, 238, rollers 250 being fabricated from a chemically resistant material and having cylindrical surfaces 252 of a suitable chemically resistant resilient material such as silicone rubber. A plurality of elongated tabs such as at 254 are formed as an integral part of the plates 236, 238. The tabs 254, rollers 250, and selected surfaces of spacer blocks 244, 246 are proportioned, shaped, and positioned such that they will grasp and slide a frame of film along a serpentine path through the processing chamber 222. Movement of the rollers is effected via a gear train, seen in FIG. 5c, comprising a plurality of intermeshed gears 258. Gears 258 are in turn coupled to a drive gear disposed through the opposite side of the assembly 234 via a drive shaft 260 to which is drivingly coupled a gear 262, gear 262 being disposed outwardly of the sidewall 264 of the processing tank 222. An elongated bearing block 266 is preferably provided, block 266 being fixedly secured to plate 236 and providing additional bearing support for the shaft 260 adjacent its driven end.

A plurality of laterally extending tabs 268 are formed as an integral part of the processing tank 222 and are provided with cylindrical holes 270 which function as bearings for elongated drive shaft 272 extending the length of the processing tank 222. A plurality of worm gears 274 are drivingly coupled to the shaft 272, worm gears 274 drivingly engaging gears 262. Also drivingly connected to end 273 of shaft 272 is a driven sprocket (not shown). An electric motor 278 is mounted in the bottom of housing 202 and has drivingly coupled to its output shaft 280 a driving sprocket 282, and a continuous drive element such as roller chain 284 is trained about the driven sprocket (not shown) and sprocket 282. It will be apparent that the speed of rotation of the rollers 250 and correspondingly the speed of movement of the cut frame 102 of film through the processor tank 222 can be simply and accurately adjusted by altering the diameter ratios of the sprockets. This in turn, provides one means for varying and accurately controlling the developing time of a frame 102 passing through the processor 200.

It should also be observed that the guide tabs 254 are arranged in pairs with the tabs being spaced relatively far apart adjacent the ends thereof where a film frame 102 enters and tapers towards each other in the direction of flow of the film frame (as indicated by arrow 290). The tabs themselves are spaced apart in the direction of movement of the frame 102. This structure significantly reduces the possibility of jamming of the film frames as they pass through the processor, reduces abrasion to the emulsion surface of the film, and assures that the developing chemistry will fully and completely coat the emulsion surface of the film frame 102 as it passes through the chambers 224.

As can best be seen in FIGS. 4 and 5d, the back wall 292 of the processing tank 222 is provided with a plurality of generally rectangular openings 294 which communicate with a corresponding plurality of upstanding vent stacks 296, stacks 296 having a generally rectangular, vertically extending opening as at 298 (FIG. 4 only). Vent tube fittings 298 are fluid tightly fitted to each of the stacks 296. Fittings 298 each include a vertically depending portion 300 of rectangular cross-section which fits tightly within the openings 298 and extend a small distance below the edge 202 of the openings 294. The upper ends of fittings 296 are provided with conventional nipples 306 to which are fixedly secured flexible tubes 308 (FIG. 4 only).

The entire processing tank 222 is rigidly supported within the housing 202 and a dividing wall 310 extends between the lower floor panel 204 of the housing 202 and the bottom surface 232 of the tank 222. A plurality of fittings 312 are fixedly secured to the drain fittings 230, fittings 312 depending downwardly therefrom and being provided with an elbow portion 314 (FIG. 4 only) at their lower ends, the elbow portions 314 extending through suitable openings in wall 310. Conventional tubing fittings 316 (FIG. 4 only) are affixed to the distal ends of the fittings 312 by means of which flexible tubes 318 are fixedly and fluid tightly secured to the lower ends of each of the fittings 312.

Mounted in the opposite side 320 of housing 200 are a plurality of reservoir tanks 322, there being five such tanks 322 in the illustrated embodiment. As viewed in FIGS. 5a through 5e, the tanks contain developer, bleach, fix, water, and water, respectively, from right to left. The particular formation of the individual developing chemicals used will of course, vary depending upon the type of film being processed and the particular source of the chemistry. In a working embodiment of the invention, the developing chemistry is manufactured by Ciba Geigy and produces a direct positive print from an exposed emulsion also provided by the Ciba Geigy Company.

The reservoir tanks 322 are shown with broken sidewalls 324, 326 to illustrate that these tanks may be of any desired size, or for that matter, configuration, depending on the quantity of chemical to be stored, size requirements of the processor, and the like, it being necessary only that the reservoir tanks 322 have a capacity at least equal to and preferably greater than the capacity of the individual processing chambers 224.

The reservoir tanks 322 are supported on an elongated manifold member 328. Member 328 extends between the opposite ends 312, 314 of the processor housing 202 and is supported thereon for vertical movement as indicated by arrow 330 by a pair of conventional drawer guide assemblies as at 322 whereby the manifold member can move smoothly but positively in a vertical direction. Housing ends 212, 214 are provided with a pair of vertically extending slots 334 (FIG. 4) through which extend lifting and detent mechanisms illustrated in FIG. 7. The detent mechanisms include a slide support member 336 of generally U-shaped configuration which forms, in cooperation with manifold member 328, a rectangular slot 338.

A slide bar 340, having a cross-section complementary to slot 338, is reciprocally received therein and includes an end portion 342 having a width complementary to the width of slot 334 which extends outwardly therethrough. Slide bar 340 is provided with a spring slot 344 which is disposed within the slot 338 and extends longitudinally with respect thereto. A retaining pin 346 extends laterally through member 336 and is fixedly secured to the manifold member 328, the compression spring 350 being disposed between pin 346 and end 352 of slot 344. An angle shaped handle 354 is fixedly secured to the distal end 342 of slide member 342, handle 354 having a flange portion 356 complementary to the laterally extending slots 358 and 360 formed adjacent the upper and lower ends of the slot 344, respectively.

In operation, handles 354 can be withdrawn outwardly to disengage portions 356 thereof from the slot portions 358 or 360 and the entire manifold assembly may be moved upwardly or downwardly, as desired. When the manifold has been thus moved, the handles 354 move inwardly under the force of springs 350 re-engaging handle portions 356 with respective slot 358 or 360 to positively lock the manifold in a raised or lowered position.

Figure 6:
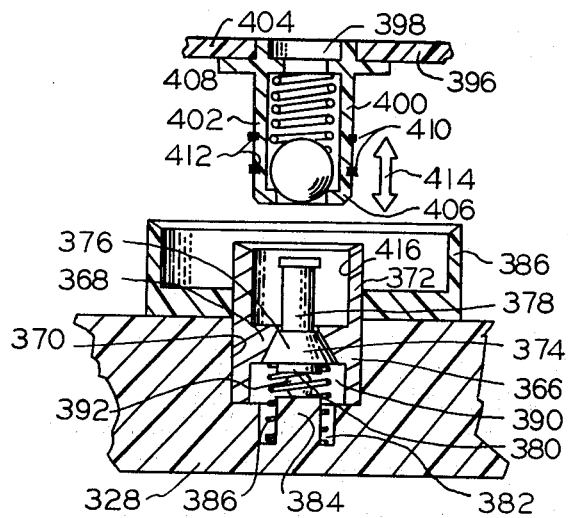
FIG. 6 is a fragmentary cross-sectional view of a valve assembly of the processor unit taken generally along section line 6—6 of FIG. 4.
Figure 7:
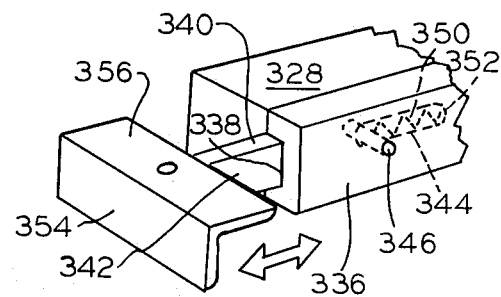
FIG. 7 is a fragmentary, partially cut away perspective view showing details of the reservoir tank raising and lowering mechanism.

As can best be seen in FIGS. 4 and 6, a plurality of valve receptacles 366 are mounted to the manifold member 328 in spaced-apart relationship, there being such a valve receptacle for each of the reservoir tanks 322. Receptacles 366 each comprise an inner, stepped cylindrical socket 368. Sockets 368 are fluid tightly received in a complementary cylindrical recess 370 formed in manifold member 328, the upper portion 372 of the sockets 368 extending upwardly from the manifold member 328. Centrally within the socket 368 is formed a tapered valve seat portion 374 in which is seated a poppet valve 376. Poppet valve 376 is further provided with upstanding tapet portion 378 extending axially upwardly within the portion 372. The lower surface of valve 376 is provided with a cylindrical spring-retaining portion 380 and the bottom of hole 370 is provided with a reduced diameter annular slot 382 which defines an upstanding, cylindrical bumper 384. A coil spring 386 is engaged by portion 380 and bumper 384, spring 386 maintaining the valve 378 in its closed position. An enlarged, annular drip trough 386 encircles socket portion 372. The lower portion 390 of hole 370 communicates with an orifice 392 (FIG. 4 only) which in turn is provided with a conventional tube fitting 394 to which is affixed the remaining end of flexible tube 318.

Reservoir 322 is provided in its lower wall 396 with a discharge opening 398 to which is fluid tightly affixed a male valve assembly 400. Assembly 400 includes a hollow, generally cylindrical stem 402 provided with inwardly extending annular flanges 404, 406. A spherical valve element 408 is received within stem 402 and is maintained in engagement with flange 406 by a spring 408 compressed between flange 404 and the element 408. A plurality of "0" ring seals 410 are engaged within annular slots 412 formed in the outside surface of stem 402. In operation, when the stem 402 of assembly 400 is inserted into the socket portion 372, as indicated by arrow 414, the spherical element 408 will initially contact valve tappet 378 and, simultaneously, the lower (as viewed in FIG. 6) one of 0 rings 412 will engage the cylindrical inside surface 416 of the socket portion 372. By selecting a spring 408 for the male valve assembly 400 which is of a higher coefficient than the spring 386 supporting the poppet valve 376, the spherical element 408 will force the poppet valve 376 open while spherical element 408 remains in engagement with the flange 406. Simultaneously, a fluid tight seal will be formed by the "0" ring 412 with surface 416 while the male valve assembly 400 into the socket 372 will cause valve 376 to move into abutment with bumper 384. Further insertion of the male valve assembly 400 will force spherical element 408 upwardly opening the male valve assembly and establishing fluid communication between reservoir 322, through orifice 392, tube 318, fitting 314, into the associated one of the processing chambers 224 without any leakage or loss of fluid.

An upper vent manifold 420 extends laterally of the housing 200, manifold 420 being removably secured to a pair of upstanding brackets 422 which are, in turn, fixedly secured to the lower manifold member 328. The vent manifold 420 is secured by means of removable pins 424 frictionally received through brackets 422 and the manifold 420.

Manifold 420 is, in a manner, similar to manifold member 328, provided with a plurality of cylindrical sockets 430, there being one such socket for each of the reservoir tanks 322. Sockets 430 are not provided with a poppet valve but sockets 430 are provided with a valve operating stud 432 which extends vertically downwardly and axially therein, studs 432 being secured by means such as a threaded fastener 434. Sockets 430 communicate with the exterior of manifold 420 via orifices 436, the outer ends of which are provided with conventional tube fittings as at 437. Respective ones of the flexible tubes 308 are fixedly secured to the fittings 437 thereby providing a fluid tight connection between fittings 300 and the reservoir tanks. The upper walls 438 of the reservoir tanks 322 are provided with a valve assembly 439 which is identical in configuration to the valve assemblies 400.

It will be observed that the valve assembly 439 will in fact open before the valve assembly 439 is fully inserted. However, the "seal before open" function is not required since no spillage from the upper valves 439 will occur as the valve opens.

To further control the speed of development of the photographic emulsion passing through the processor, the developing, bleach, and fix processing chambers in FIGS. 5e, 5d, and 5c, respectively, are preferably provided with electrical heating elements as at 440. The lower walls of chambers 224 are also provided with a suitable hollow blister 442 and a thermo-couple element 444 is threadingly secured therein to sense the temperature within the processing chambers 224. A conventional thermostatic control circuit 446, shown only figuratively in the drawings, is electrically connected to the heating elements 440 and thermisters 444 as has a suitable source of operating potential. These elements cooperate, in a conventional manner, to regulate the temperature of the processing chambers at any desired temperature. In a working embodiment of the invention, the processing chambers for the developer, bleach, and fix are maintained at about 100° F., this temperature having been found effective for accelerating the developing of a photographic emulsion without causing any significant deterioration of the processing chemistry itself.

Because contamination caused by the transfer of chemicals between individual ones of the processing chambers will hasten deterioration of the chemistry, the open tops of the processing chambers 224 are closed by means of a suitable elongated cover panel 450. Panel 450 is dimensioned and shaped to engage the upper surfaces of the guide support elements 246. While this cover does not fully eliminate all evaporation and transfer of chemicals from one processing chamber 224 to another, the cover does substantially reduce evaporation, reduce the dispersement of noxious or offensive odors, and reduces contamination.

Adjacent the input end of the processing tank 222, this being the right end as viewed in FIG. 5e, there is provided an upstanding, generally rectangular receptacle 454. Receptacle 454 is divided into upper and lower chambers 456, 458 by means of a transverse wall 460. A rectangulr slot 462, dimensioned to pass a photographic exposure easily therethrough, is provided through the wall 460, the slot 462 being disposed generally centrally in the wall 460. The upper compartment 456 of receptacle 454 is dimensioned to slidably receive the lower end of the septum 96 therein. Preferably, the upper end of compartment 456 is provided with a suitable, light blocking fabric 466.

Figure 3:
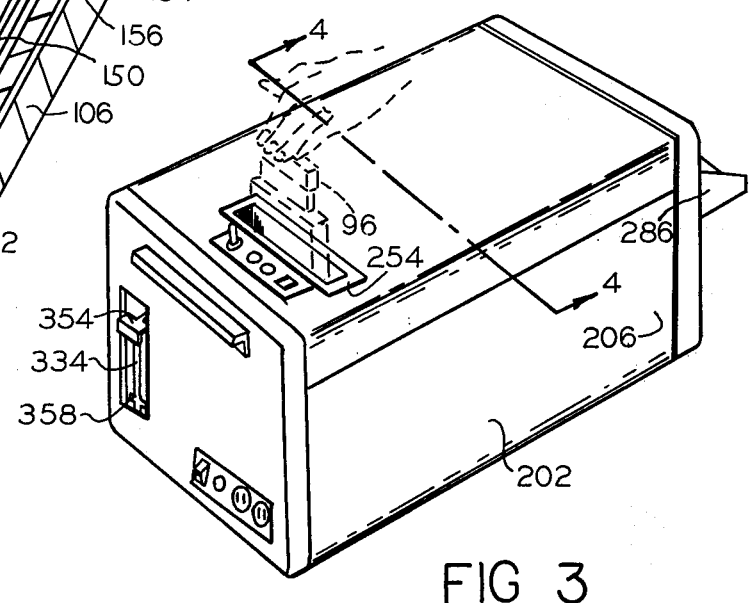
FIG. 3 is a perspective view of the processor unit with the film transfer vehicle, shown in phantom, inserted therein.

Pivotably secured within compartment 458 is a door 468, door 468 being pivoted for movement between a closed position, illustrated in FIG. 5e, and an open position, this movement being indicated by arrow 470. The shaft 472 by which door 468 is mounted, extends outwardly from the receptacle 454 and has an elongated arm and weight 474 affixed thereto such that the arm and weight 474 maintain the door 468 in its closed position. Also secured to the shaft 472 is a small actuating arm 476, the distal end of which engages a small, electrical switch 480. Switch 480 is in turn connected to an indicator light 482 (FIG. 3 only) such that the indicator light 482 is illuminated whenever the door 468 is open.

A photographic frame 118, having traversed each of the processing chambers 224, exists the processing chamber in a fully developed state and is dropped into a drying tray 486 mounted to the exterior of the processor housing 202. Preferably, a small electric fan 488 is mounted within the enclosure 202. Fan 488 forces a stream of air upwardly through an air duct 490 past an electrical heating element (not shown) to heat the air stream, and the air is exhausted over the frame 118 lying in drying tray 486 to dry same.

Figure 11:
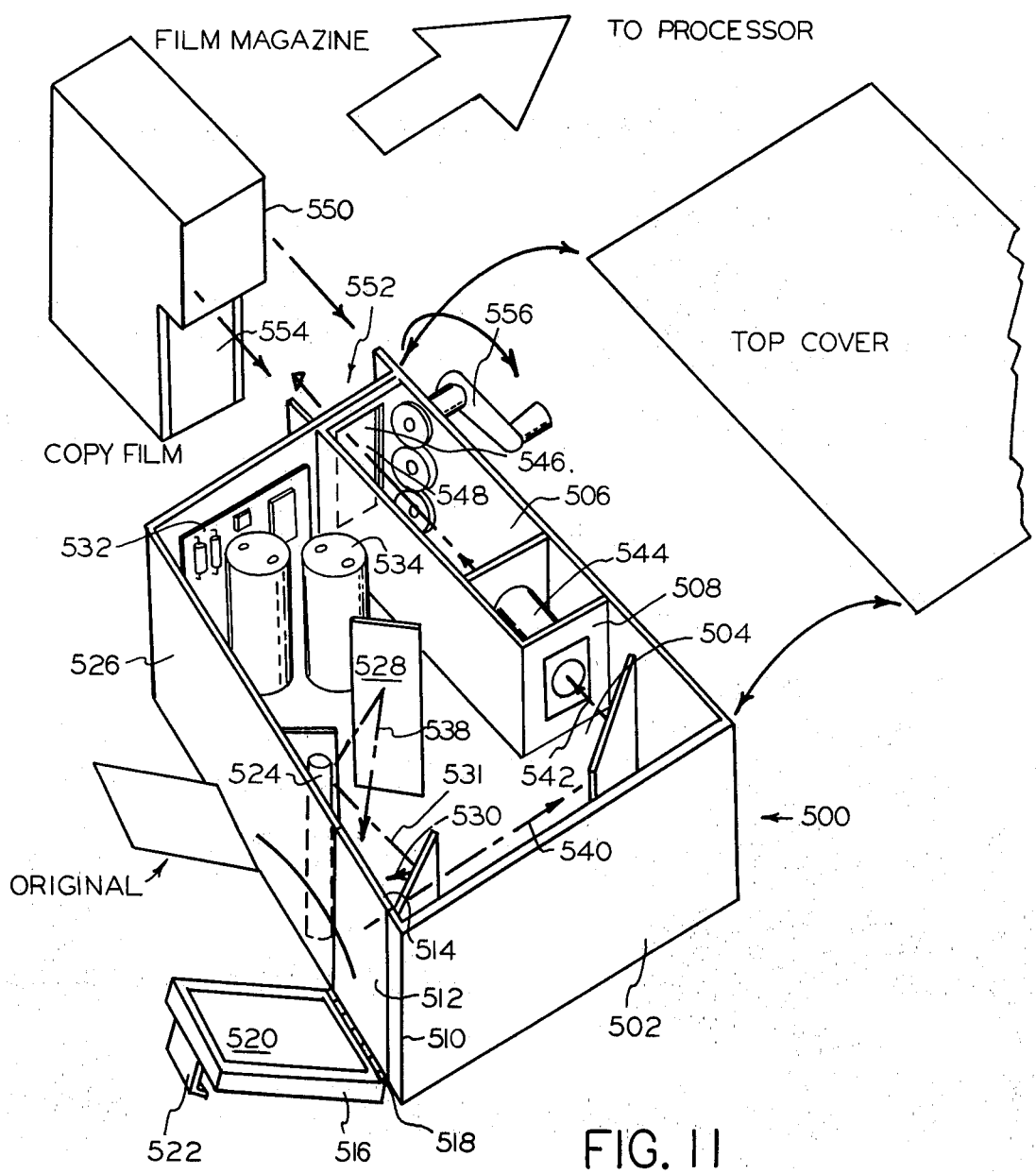
FIG. 11 is a perspective view of a print copying camera for use in the system of the invention.

Referring now to FIG. 11, there is illustrated a copy producing camera 500. Camera 500 comprises generally a rectangular light-tight enclosure 502 which may be of any conventional construction. Internally, enclosure 502 is divided into an original exposing chamber 504 and a copy film chamber 506 separated by a light-tight wall 508. Adjacent one corner 510 of enclosure 502, the copy exposing chamber 504 is provided with an aperture 512 which is fitted with an optical quality glass window 514. An original retaining door 516 is hingedly mounted to the enclosure 502 adjacent its lower edge 518 such that it can be pivotably moved between an open position as illustrated and a closed position in which its inner surface 520 is contiguous and parallel to window 514. Preferrably, spring means (not shown) are provided for maintaining the door 516 in its closed position and a finger handle 522 is fixedly mounted to the door 516 for moving same into an open position as illustrated to permit placement of an original photographic print to be copied.

Within chamber 504 is mounted a high intensity light source 524 which, in a working embodiment, is mounted closely adjacent and parallel to wall 526 of the enclosure 502. Light source 524 may be a conventional photo flash device or a high intensity quartz light and is so situated that it does not illuminate the window 514 directly.

A pair of first-service mirrors 528, 530 are optically positioned with respect to the light source 524 such that light emanating from the latter will be reflected by the mirrors 528, 530 onto the window aperture 512 at about 45° angles, as indicated by arrows 531, an angle of illumination that has been found optimum for illuminating a subject (print) during a photographic exposure. Conventional electronics indicated by the printed circuit board 532 and capacitors 534 are mounted within the enclosure 502 to provide a suitable source of operating potential for the light source 524.

An original print 538 is placed with its image surface in contact with the window 514 and door 516 is closed to maintain the print in contact with the window 514. When the door 516 is closed, it prevents the passage of any stray light from the exterior of the enclosure 502 into the chamber 504.

The image of the print 538 is transmitted along an optical axis 540 and reflected at a 90° angle by a first surface, optical quality mirror 542 fixedly mounted within the enclosure 502 at about a 45° angle and an optical alignment with the optical axis 540. The transmitted image is reflected along optical axis 542, passing through a conventional lens and shutter assembly 544 which forms an image of the print on image plane 546 disposed within a second aperture 548 in the distal end of the chamber 506. The shutter assembly 544 is preferably electrically interlocked with the lighting means 524 for synchronous operation therewith.

A film magazine 550 substantially identical to film magazine 66 is removably received in a magazine receiving recess 552 adjacent the aperture 548 such that a frame of positive print film 554 is disposed with its emulsion surface in image plane 546. A film advance mechanism 556 and film cut off mechanism (not shown in FIG. 11) substantially identical to the film advance and film cut off assemblies of the composite image identification card camera 10 illustrated in FIG. 1 are mounted within the enclosure 502 and perform the same functions of advancing a frame of film 554 and cutting same off after exposure. Beneath the aperture 548, a film transfer device receptacle (not shown in FIG. 11) similar to the film transfer device receptacle 106 of FIG. 1 is provided for receiving the film transfer device 96 which in turn receives an exposed frame of positive print film internally thereof for transfer to the processor of FIGS. 3, 4, and 5.

In operation, the original print 538 is positioned against the window 514 as above described. The illuminating means 524 is energized simultaneously with opening of the shutter mechanism 544 causing an image of the original print to be exposed onto the emulsion surface of the frame 554 of positive print film disposed in image plane 546. Upon completion of the exposure, the film in magazine 550 is advanced by the mechanism 556 and severed by film cut off mechanism (not illustrated in FIG. 11). As the film is advanced it again passes partially into the film transfer vehicle 96 (not illustrated in FIG. 11), is withdrawn into the film transfer vehicle and the latter removed from the camera 500 for transfer of the exposed film frame 554 to the processor. The exposure thus formed, upon development, will be an exact copy of the positive original print placed against window 514. This type of camera is particularly advantageous for making copies of snap shots or other positive print photographs. Again, because and by reason of the provision of the processor unit of the present invention, copy prints of the original print can be provided in a matter of minutes, the system can be operated by relatively inexperienced personnel, and the system can be transported as desired. If desired, the copy camera 500 processor, etc., can be located in places such as shopping center malls, photographic retail outlets, and the like.

In operation, using the camera 10 as an example, a subject (not shown) is seated in alignment with optical axis 30. The location and distance of the subject from the subject lens assembly 28 is effected by means of the aiming light 90. Simultaneously, a data card carrying identification indicia such as a physical description and qualifications of the subject is placed within the data card holder 40. The shutter assemblies 32, 46 are simultaneously operated and the photo flash assemblies 54, 56 are similarly simultaneously operated and in synchronism with the shutter assemblies 32, 46. This in turn exposes a composite image of the subject and the indicia on the frame of film 38 disposed in the plane 38 of the camera. If the transparent plate 78 mounted in front of the film frame 38 is provided with an indicia, this indicia will also be formed as a part of the composite image exposure.

The film frame is now advanced by depressing lever 88 which moves the film downwardly past cutter bar 98 until the distal portion thereof is received within the septum 96. The film cut-off lever 100 is now operated such that the rotating cutter bar 98 severs the film frame, now identified as frame 118. Next in sequence, the sliding member 142 of the septum 96 is withdrawn thereby grasping the film frame 118 and drawing the same into the septum 96 and maintaining same in a light-tight environment. The septum release lever 104 is depressed and the septum released from the camera.

Next, the end 116 of septum 96 is inserted into the receptacle 454 of the processor 200. The sliding member 142 is depressed thereby ejecting the film frame 138 downwardly through slot 462 until the distal end thereof engages the first pair of rollers 250. This movement of the film frame also automatically opens the door 468 extinguishing the light operatively coupled to switch 480. The rollers, which are rotating, by reason of operation of the motor 478, engage the distal end of the film frame 118 (not shown in FIG. 5e) drawing same down into the first of the processing tanks of the processor 200. When the film frame has been fully drawn into the processing tank 224, the door 468 closes, preventing the entry of light into the processing chamber, the light associated with switch 480 is reilluminated, and the septum can be removed and returned to the camera 10.

Within the processor, reservoir tanks 222 are, prior to initiation of processing, inserted into the processor 200, with the valve assemblies 400 thereof being first inserted into the manifold member 328. When the valve assemblies have been fully seated within the sockets 368, the vent manifold 420 is pressed downwardly over the valve the vent manifold 420 is pressed downwardly over the valve assemblies 439 thereby opening same. During this operation, the reservoir tanks are normally in their lowered position adjacent the bottom of the housing 202. The handles 354 of the latch assemblies (FIG. 7) are now pulled outwardly and the reservoir tanks 322 with the associated manifold member 328 and vent manifold 420 are raised to the position illustrated in FIG. 4. The handles 354 are returned to their inwardly disposed positions engaging the lateral slots associated with slot 344 thereby positively locking the reservoir tanks 322 in their raised positions. Simultaneously, the chemistry within the reservoir tanks 322 begins to flow via flexible tubes 318 into respective ones of the processing chambers 224. The fluid level within the processing chambers 224 rises until the fluid level reaches the lower surfacce of fittings 300. At this point of time, the fluid closes the fittings 300 preventing the further passage of air through the vent valves 400 in the top of the reservoir tanks 322 and flow of fluid from the reservoir tanks 322 into the processing chambers 224 stops. If it is desired to transport the processor 200, the reservoir tanks 222 are simply lowered which permits the fluid within the processing chambers 224 to drain back into the reservoir tanks 322. Because of the somewhat restricted flow paths, the chemistry within the reservoir tanks 322 is positively maintained against spillage during transport of the system except under extreme or abusive conditions.

It will further be observed that as evaporation and other fluid losses cause the fluid level within the processing chambers 224 to drop and, as chemistry is removed from individual ones of the processing chambers 224 into a next adjacent processing chamber by reason of a small quantity being wetted to the surface of a film frame 118 passing through the processor 200, the fluid level automatically will be returned to its normal fluid level by reason of the fluid level opening the fittings 300 permitting a small quantity of air to flow into the reservoir chambers 322 and allowing an additional flow of chemistry into the processing chamber 324. This maintenance of the fluid level continues so long as the reservoir tanks 322 remain in their raised positions.

In a working embodiment of the invention, it has also been found that it is necessary to provide fittings 300 having a relatively large opening at the lower end thereof. This is necessary inasmuch as the miniscus of the processing chemistry is of sufficient strength that, when a small fitting is used, the miniscus will bridge the open end of the fitting, i.e., the end of the fitting disposed within the processing chambers 224, and thereby prevent the passage of air through the tubing 308. This in turn prevents the free passage of fluid into the processing chambers and can also prevent the proper draining of fluid from the processing chambers back into the reservoir tanks 322 when the latter are lowered. By providing a fitting having a relatively large opening, the miniscus must bridge a substantially wider distance. Correspondingly, the shearing force applied to the miniscus is greater and the miniscus is easily broken. Thus, by the provision of the enlarged fittings, the positive opening of the fittings is ensured.

It has also been found that in the processing of photographic emulsions, the chemistry within the processing chambers 224 deteriorates over a period of time due to use and exhaustion of the chemicals therein. It has thus, further been found, that by providing reservoir tanks 322 of substantially larger volume than the volume of the processing chambers 224, the chemistry within the processing chambers can be effectively replenished or revitalized by simply lowering and raising the reservoir tanks 322 one or more times permitting fresh chemistry to be mixed with depleted chemistry. This effectively extends the operating life of the system on a single refill of processing chemistry.

When the chemistry has been fully exhausted, the reservoir tanks 322 are simply removed and returned to a central facility for replacement of the chemicals or discarded and fresh reservoir tanks 322 inserted in their place.

From the above description it will be seen that the present invention provides a complete, portable and convenient facility for processing photographs and particularly such a facility well suited for the on site production of photo identification cards and photographic "copy" prints. This system comprises three individual but structurally interrelated components: a camera, a processor, and a septum or transfer vehicle 96 for transferring film from the camera 10 to the processor 200. The entire system requires no special skills to operate and both the supply of film and processing chemistry can be effected by untrained personnel. When it is desired to transport the system from one operating location to another, the reservoir tanks 322 are simply lowered and the individual elements of this system are then easily transported without danger of spillage or the like.

While there have been described above the principles of this invention in connection with specific apparatus, it is to be clearly understood that this description is made only by way of example and not as a limitation to the scope of the invention.

What is claimed is:

1. An apparatus for producing photographs comprising a camera, film processor, and a septum, the camera including means for producing a photographic exposure, a camera septum receptacle and means for selectively transporting at least a portion of said photographic exposure into a transported position disposed in said camera septum receptacle, said processor including means for developing said exposure into a photographic print, a processor septum receptacle and means for transporting said exposure from said processor septum receptacle into and through said processor, said septum including a light impervious film chamber, a film transfer aperture, and an end portion complementary to said camera and said processor septum receptacles, said film transfer aperture communicating between said film chamber and the exterior of said end portion, said aperture and said chamber being in light-tight communication with the interior of said camera and said processor receptacles when said end portion of said septum is received in said camera and processor receptacles, respectively, said portion of said photographic exposure being received in said septum when said septum is received in said camera septum receptacle, said septum further including manually operable means for selectively drawing and ejecting said exposure into and from said film chamber through said aperture and including a manually operable slide element and a film grasping mechanism secured to said slide element, said grasping mechanism being operable between grasping and open conditions in response to movement of said slide element to thereby grasp and release said film exposure, respectively, and light blocking means for preventing entry of light into said film chamber.

2. The apparatus of claim 1 wherein said light blocking means includes oppositely disposed fibrous pads mounted adjacent said aperture and spring means for resiliently urging said pads into engagement with oppositely disposed ones thereof.

3. The apparatus of claim 2 wherein the interior surfaces of said septum include longitudinally extending ribs, said photographic exposure grasping means including a plurality of spring elements fixedly secured to the interiorly disposed end of said slidable element, said springs including cam portions disposed to engage said longitudinal ribs when said slide element is moved outwardly from said septum and clamping finger portions, said finger portions being spaced apart when said cam portions are disengaged from said longitudinal extending ribs and being moved together in response to engagement of said cam portions with said ribs.

4. The apparatus of claim 3 further including manually operable latch means mounted to said camera adjacent said camera receptacle for selectively locking said septum into said camera septum receptacle.

5. The apparatus of claim 4 wherein said camera septum receptacle further includes light sealing pads mounted therein, said pads engaging the periphery of said septum when said septum is received in said camera septum receptacle to thereby prevent impingement of light on said photographic exposure as said photographic exposure passes from said camera into said septum film chamber.

6. The apparatus of claim 1 wherein said processing means includes a light-tight processor housing, a processing tank including a plurality of juxtaposed developing chambers, a plurality of photographic developing chemistry reservoir tanks positioned adjacent said developing tanks, means for selectively supporting said reservoir tanks in positions raised and lowered with respect to said processing tank, and fluid transfer means connecting said individual one of said reservoir tanks to a corresponding one of said developing chambers for passing photographic developing chemistry contained therein from a said reservoir to a said developing chamber when said reservoir tanks are in said raised positions, and from a said developing chamber to a said reservoir tank when said reservoir tanks are in said lowered position.

7. The apparatus of claim 6 wherein said reservoir tanks are closed, said fluid coupling means including vent conduits communicating between said processing chambers and said reservoir tanks, one end of said vent conduits communicating with said reservoir tanks through an orifice disposed at the desired photographic developing chemistry level in said processing chambers, the other end of said vent conduit communicating with the interior of the respective one of said reservoir tanks through the upper wall thereof, and chemistry conduit means communicating between a chemistry orifice in the bottom of said reservoir tanks and a chamber orifice communicating with the bottom of a respective one of said processing chambers.

8. The apparatus of claim 7 wherein said reservoir tanks are removable.

9. The apparatus of claim 8 further including first valve means operatively connected between said chemistry orifice and said chemistry conduits for automatically closing said chemistry orifices when said reservoir tanks are removed from said processor, said valve means further including means for fluid tightly connecting said reservoir tanks to said chemistry conduits before said valve means is open and automatically closing said valve means before said reservoir tanks are disconnected from said chemistry conduits.

10. The apparatus of claim 9 wherein said first valve means includes a valve manifold having a valve socket element for each said reservoir tank, a valve housing connected to each said reservoir tank and communicating with said reservoir tank orifice, each said valve housing being complementary to a said socket element and being slidably received therein, a valve closing element and a valve seat in said housing, spring means for resiliently closing said closing element against said seat, and valve sealing means for forming a fluid tight seal between said valve housing and said socket when said housing is inserted therein, valve operator means for engaging said valve element when said valve housing is received in a respective one of said socket elements for separating said valve closing element from said valve seat, thereby opening said valve, said valve operator means engaging said valve closing element after said sealing means has formed a fluid tight seal with said socket.

11. The apparatus of claim 10 wherein said sealing means includes at least one "O" ring encircling said valve housing, said "O" ring fluid tightly engaging said socket element before said valve operator engages said valve closing element.

12. The apparatus of claim 11 wherein said means for manually raising and lowering said reservoir tanks includes at least one handle operably connected to said manifold, manifold guide means fixedly secured to the interior of said housing and including a manifold slide element slidably engaged and longitudinally moveable therewith, said manifold slide element being fixedly secured to said manifold, and locking means operatively connected between said handles and said housing for selectively locking said manifold to said housing in said raised and lowered positions respectively.

13. The apparatus of claim 10 further including a vent valve operatively connected to said reservoir tanks in communication with said vent orifice, a vent manifold including a plurality of socket elements slidably and fluid tightly engaging said vent valves, and vent valve operator means mounted within said vent valve manifold for engaging and opening said vent valves when said vent valves are inserted therein.

14. The apparatus of claim 7 wherein said vent conduits further include a vent conduit fitting fixedly mounted within each of said processing chambers, the distal end of said vent fittings having an enlarged distal end portion positioned within said processing chamber at the desired level of photographic developing chemistry therein.

15. The apparatus of claim 14 wherein said vent and said chemistry conduits include flexible tubes to thereby permit raising and lowering of said reservoir tanks.

16. The apparatus of claim 6 wherein said means for transporting said exposure in said processor includes a plurality of pairs of rotatably engaged rollers, motor drive means for synchronously rotating said rollers, a plurality of tab elements disposed in pairs between said pairs of rollers in positions to guide a photographic exposure from one said pair of rollers to the next, said tab elements of each said pair of tab elements tapering towards each other in the direction of movement of said photographic exposure through said processor.

17. The apparatus of claim 16 wherein said processor septum receptacle includes an aperture complementary to the peripheral surface of said septum and second light blocking means mounted processor septum receptacle adjacent said aperture, said second light blocking means being movable between open and closed positions in response to movement of said photographic exposure to thereby permit passage of said photographic exposure into said processing means, said light blocking means being automatically closed when said photographic exposure has passed through said aperture thereby preventing entry of light thereinto.

18. The apparatus of claim 17 wherein said second light blocking means includes a door closing said aperture and means for resiliently retaining said door in a closed position, said door being moved between said closed and said open positions in response to ejection of said photographic exposure from said septum.

19. The apparatus of claim 18 further including indicating means operatively connected to said door for indicating that said door is closed and open to thereby prevent removal of said septum from said receptacle before said photographic exposure has fully passed through said aperture.

20. For use in an apparatus for producing photographs which includes a camera and a film processor, a septum including an end portion manually engagable with a portion of said camera and said film processor for forming a light-tight junction therewith, a light impervious film chamber, and a film transfer aperture communicating with said end portion, said aperture and said chamber being in light-tight communication with the interior of one of said camera and said processor when said portion is in said light-tight communication therewith, respectively, said septum further including manually operable means including a manually operable slide element and a film grasping mechanism secured to said slide element, said grasping mechanism being operable between grasping and open positions in response to movement of said slide element to thereby grasp and release a said film exposure, respectively, for selectively drawing and ejecting a photographic exposure from said camera and into said processor, respectively, in response to operation thereof, and light blocking means for preventing entry of light into said film chamber through said aperture.

21. The apparatus of claim 20 wherein said means for drawing and ejecting a photographic exposure into and from said film chamber includes a manually operable slide element slideably received through the end of said septum opposite said aperture, said film grasping mechanism secured to said slide element, said grasping mechanism being operable between grasping and open conditions in response to movement of said slide element to thereby grasp and release a said film exposure, respectively wherein said light blocking means includes oppositely disposed fibrous pads bonded adjacent said aperture and spring means operatively engaging same for resiliently urging said pads into engagement with oppositely disposed ones thereof.

22. The apparatus of claim 21 wherein the interior surfaces of said septum includes longitudinally extending ribs disposed within said film chamber, said photographic exposure grasping means including a plurality of spring elements fixedly secured to the interiorally disposed end of said slidable element, said springs including cam portions disposed to engage said longitudinal ribs when said slide element is moved outwardly from said septum and clamping finger portions fixedly connected to said cam portions, said finger portions being spaced apart when said cam portions are disengaged from said longitudinally extending ribs and being moved together in response to engagement of said cam portions with said ribs.

23. An apparatus for processing photographic film including a light-tight processor housing, a processing tank including a plurality of juxtaposed developing chambers, a plurality of photographic developing chemistry reservoir tanks positioned adjacent said developing tanks, means for selectively supporting said reservoir tanks at positions raised and lowered with respect to said processing tank, and fluid transfer means connecting individual ones of said reservoir tanks to a corresponding one of said developing chambers for passing photographic developing chemistry contained therein from said reservoir to said developing chambers when said reservoir tanks are in said raised positions, and from a said developing chamber to a said reservoir tanks when said reservoir tanks are in said raised positions, and from a developing chamber to a said reservoir tanks when said reservoir tanks are in said lowered positions, said fluid transfer means including vent conduits communicating between said processing chambers and said reservoir tanks, one end of said vent conduits communicating with said reservoir tanks through an orifice disposed at the desired photographic developing chemistry level in said processing chambers, and the other end of said vent conduits communicating with respective ones of said reservoir tanks adjacent the upper portions thereof, and chemistry conduit means communicating between a chemistry orifice in the bottom of said reservoir tanks and a chamber orifice communicating with the bottom of respective ones of said processing chambers, and means for transporting a photographic exposure sequentially into and out of said developing chambers.

24. The apparatus of claim 23 wherein said reservoir tanks are removable.

25. The apparatus of claim 24 further including first valve means operatively connected between said chemistry orifice and said chemistry conduits for automatically closing said chemistry orifices when said reservoir tanks are removed from said processor, said valve means further including means for fluid tightly connecting said reservoir tanks to said chemistry conduits before said valve means is open and automatically closing said valve means before said reservoir tanks are disconnected from said chemistry conduits.

26. The apparatus of claim 25 wherein said first valve means includes a valve manifold having a valve socket element for each said reservoir tank, a valve housing connected to each said reservoir tank and communicating with said reservoir tank orifice, each said valve housing being complementary to a said socket element and being slidably receivable therein, a valve closing element and a valve seat in said housing, spring means for resiliently closing said closing element against said seat, and valve sealing means for forming a fluid tight seal between said valve housing and said socket when said housing is inserted therein, valve operator means for engaging said valve element when said valve housing is received in a respective one of said socket elements for separating said valve closing element from said valve seat, thereby opening said valve, said valve operator means engaging said valve closing element after said sealing means has formed said fluid tight seal with said socket.

27. The apparatus of claim 26 wherein said means for manually raising and lowering said reservoir tanks includes at least one handle operably connected to said manifold, manifold guide means fixedly secured to the interior surface of said housing and including a manifold slide element slidably engaged and longitudinally moveable therewith, said manifold slide element being fixedly secured to said manifold, and locking means operatively connected between said handles and said housing for selectively locking said manifold to said housing in a selected one of said raised and lowered positions, respectively.

28. The apparatus of claim 27 further including a vent valve operatively connected to said reservoir tanks in communication with said vent orifice, a vent manifold including a plurality of socket elements slidably and fluid tightly engaged in said vent valves, and vent valve operator means mounted within said vent valve manifold for engaging and opening said vent valves when said vent valves are inserted therein.

29. The apparatus of claim 28 wherein said vent conduits further include a vent conduit fitting mounted within each of said processing chambers, the distal end of said vent fittings having an enlarged distal end portion positioned within said processing chamber at the desired level of photographic developing chemistry therein, whereby, the miniscus between photographic developing chemistry in said processing chambers and said enlarged distal end portions is subjected to increased shear when the photographic developing chemistry in said chamber falls below said enlarged distal end portions.

30. The apparatus of claim 29 further including a photographic exposure receiving tray, said means for transporting an exposure through said processor including means for ejecting said exposure into said exposure receiving tray, and further including dryer means for exhausting heated air over said exposure disposed in said exposure receiving tray to thereby dry same.

31. A camera for use in a system including a film processor and a septum slideably and removably engagable with said camera and said processor for transferring exposed film from the camera to the processor, the camera comprising means for producing a photographic exposure on a frame of photographic film, a camera septum receptacle complementary to said septum, and means for transporting said photographic frame into said septum receptacle, said septum receptacle providing a light-tight communication with said septum when the latter is removably received in said receptacle.

32. The apparatus of claim 31 wherein said camera further includes a film magazine and film guide slot means for guiding film through said camera and into said camera septum receptacle in a position centrally thereof, said exposure transporting means transporting said exposure partially into said septum when said septum is disposed within said camera septum receptacle.

33. The apparatus of claim 32 wherein said camera septum receptacle further includes light sealing pads mounted therein, said pads engaging the peripheral surface of said septum when received in said camera septum receptacle to thereby provide said light-tight communication therewith.

34. The apparatus of claim 33 wherein said means for producing a photographic exposure includes optical means for forming a composite image of a plurality of separate subjects simultaneously on said frame of photographic film.

35. The apparatus of claim 34 wherein one of said subjects is a portrait of a person, the other of said subjects being an indicia bearing card.

36. The apparatus of claim 33 wherein said means for producing a photographic exposure includes means for forming an image of a photographic print on said frame of photographic film, to thereby provide a copy thereof.

* * * * *